United States Patent [19]

Suzuki

[11] 4,416,003
[45] Nov. 15, 1983

[54] BOTH SIDE RECORD PLAYER

[75] Inventor: Hiroyuki Suzuki, Higashihiroshima, Japan

[73] Assignee: Sharp Kabushiki Kaisha, Osaka, Japan

[21] Appl. No.: 291,805

[22] Filed: Aug. 10, 1981

[30] Foreign Application Priority Data

| Aug. 13, 1981 [JP] | Japan | 56-2812 |
| Aug. 13, 1981 [JP] | Japan | 56-2813 |
| Aug. 13, 1981 [JP] | Japan | 56-2814 |
| Aug. 13, 1981 [JP] | Japan | 56-2815 |
| Aug. 13, 1981 [JP] | Japan | 56-2816 |
| Aug. 13, 1981 [JP] | Japan | 56-2817 |

[51] Int. Cl.³ .................. G11B 17/04; G11B 3/62
[52] U.S. Cl. .................. 369/75.2; 369/78; 369/199; 369/244; 369/270
[58] Field of Search ............ 369/199, 75, 78, 79, 369/77, 244, 249, 255, 263, 270, 271

[56] References Cited

U.S. PATENT DOCUMENTS

| 2,219,230 | 10/1940 | Krause | 369/78 |
| 2,316,175 | 4/1943 | Kurzen | 369/78 |
| 2,670,211 | 2/1954 | Freimann et al. | 369/199 |
| 3,873,100 | 3/1975 | Omiya | 369/77 |
| 3,993,316 | 11/1976 | Fairbanks | 369/78 |
| 4,211,421 | 7/1980 | Torrington | 369/75 |

FOREIGN PATENT DOCUMENTS 44-10424  3/1969  Japan .................. 369/78

Primary Examiner—Steven L. Stephan
Attorney, Agent, or Firm—Birch, Stewart, Kolasch & Birch

[57] ABSTRACT

There is disclosed a record player of the vertical linear tracking type. The player includes first and second cartridges, respectively, for reproduction of front and back sides of a disc record means for driving commonly the first and second cartridges toward the center of said disc record. Both sides of the disc record are reproduced while the disc record is loaded and held in a record reproduction assembly.

10 Claims, 7 Drawing Figures

BOTH SIDE RECORD PLAYER

BACKGROUND OF THE INVENTION

This invention relates to a disc record player with both side-playing features.

Jukeboxes are generally adapted to locate a plurality of disc records in place and load selected ones of the disc records into a playing assembly or move a cartridge and the playing assembly toward the records for bothside reproduction of the disc records. As is well known in the art, a significant advantage of these jukeboxes is the ability to automatically play both sides of selected ones of the disc records.

However, the jukeboxes are inconvenient for home use because of required space, weight and complicated mechanisms.

A variety of technical problems need be resolved to avoid the above difficulty. One of these technical problems is that alignment of the disc records with respect to horizontal, vertical and radial directions demand troublesome screw adjustments and often causes error in any of the above directions. Another technical problem is interference between the opening and closing movements of a lid and reproduction of the disc records. The lid is conventionally provided to avoid dust entering the player after a selected one of the disc records is loaded in place. For both side playing, cartridge drive devices are provided on the body side and the lid side and driven via a common driving source with the aid of a pair of string-wound drums in engaging relationship one on the body side and the other on the lid side. Therefore, the opening and closing movement of the lid causes the drums to rotate and the cartridge drive devices to work. A measure to prevent such undesirable situation is needed. Furthermore, the insertion and removal of the disc records is also interfered with by the opening and closing movement of the disc records.

OBJECTS AND SUMMARY OF THE INVENTION

Accordingly, it is an object of the present invention to provide a disc record player which overcomes the above technical difficulties and provides both side-playing features for home use.

It is another object of the present invention to provide a disc record player wherein a cartridge drive device is free of the opening and closing movement of a lid during playback.

It is still another object of the present invention to provide a disc record player wherein a cartridge is held with respect to horizontal, vertical and radial directions with stability and a minimum of labor.

In accordance with the above defined objectives, the present invention provides a record player comprising a record reproduction assembly of the vertical linear tracking type and means for playing back both sides of a disc record while the disc record is loaded and held into said record reproduction assembly.

In a preferred form of the present invention, there is provided a record player comprising a record reproduction assembly of the vertical linear tracking type, first and second cartridges, respectively, for reproduction of front and back sides of a disc record means for driving commonly said first and second cartridges toward the center of said disc record and means for playing back both sides of the disc record while the disc record is loaded and held in said record reproduction assembly.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
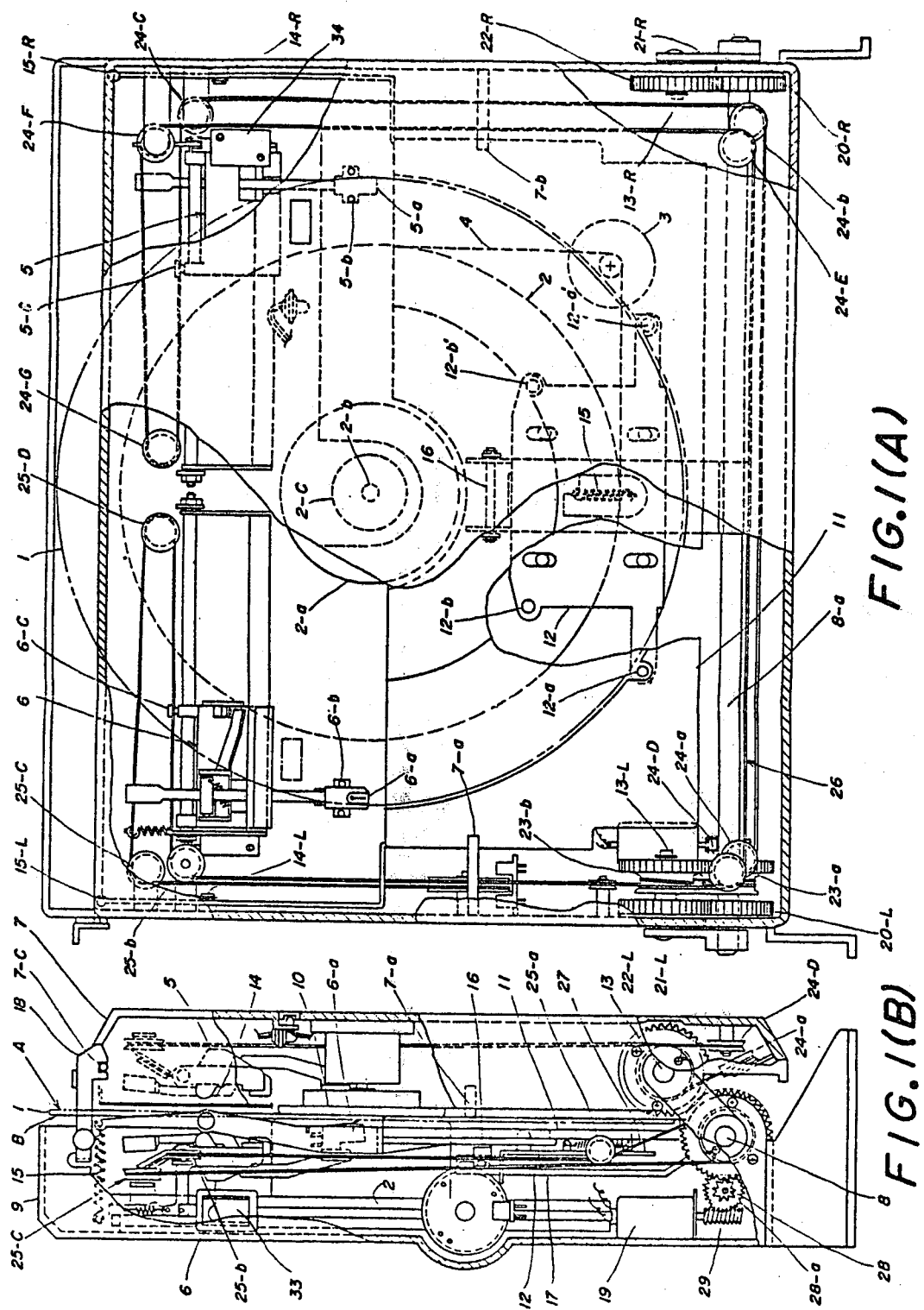
FIGS. 1(A) and 1(B) are a plan view and a cross sectional side view of a record player according to an embodiment of the present invention when the B side of the disc record is about to be played.

FIGS. 1(A) and 1(B) are a plan view and a side view showing a disc record player according to an embodiment of the present invention when it is about to play the B side of an LP disc record (30 cm diameter) 1. A turntable 2 has a record mount portion 2a of such a diameter that a cartridge 6b on the B side of a cartridge mounting portion does not strike when record playing is completed and a cartridge stylus reaches the last groove in a disc record. It is preferable that the diameter of the mount portion be as large as possible in order to prevent oscillating movement of the record during reproduction. A reversible motor 3 having two selectable speeds is provided for rotation of the turntable 2. A belt 4 is provided to convey driving force of the motor 3 to the turntable 2. This is only one example of driving the turntable and other possible methods of driving the turntable are the direct drive technique and the rim drive technique. A lid 7 is rotatably mounted on a pivot 8 and placed into the open position so that the disc record may be easily removed from and mounted on a record mount 11. A linear tracking cartridge drive assembly 5 which includes a cartridge 5a for A side playing is secured on the lid side 7. Another liner tracking cartridge drive assembly 6 which includes a cartridge 6a for B side playing is installed on the body side 9. A record pressing member 10 is secured rotatably on the lid 7 to urge the vertically positioned disc record against the turntable 2 with the aid of a spring. Details of such arrangement need not be discussed for an understanding of the present invention.

The foregoing is a brief summary of the arrangement of the home use record player which makes its possible to play both sides of the disc record. All of the events during a series of procedures from loading of the record through removal or unloading of the disc record via reproduction of the record will be described below.

Figure 2:
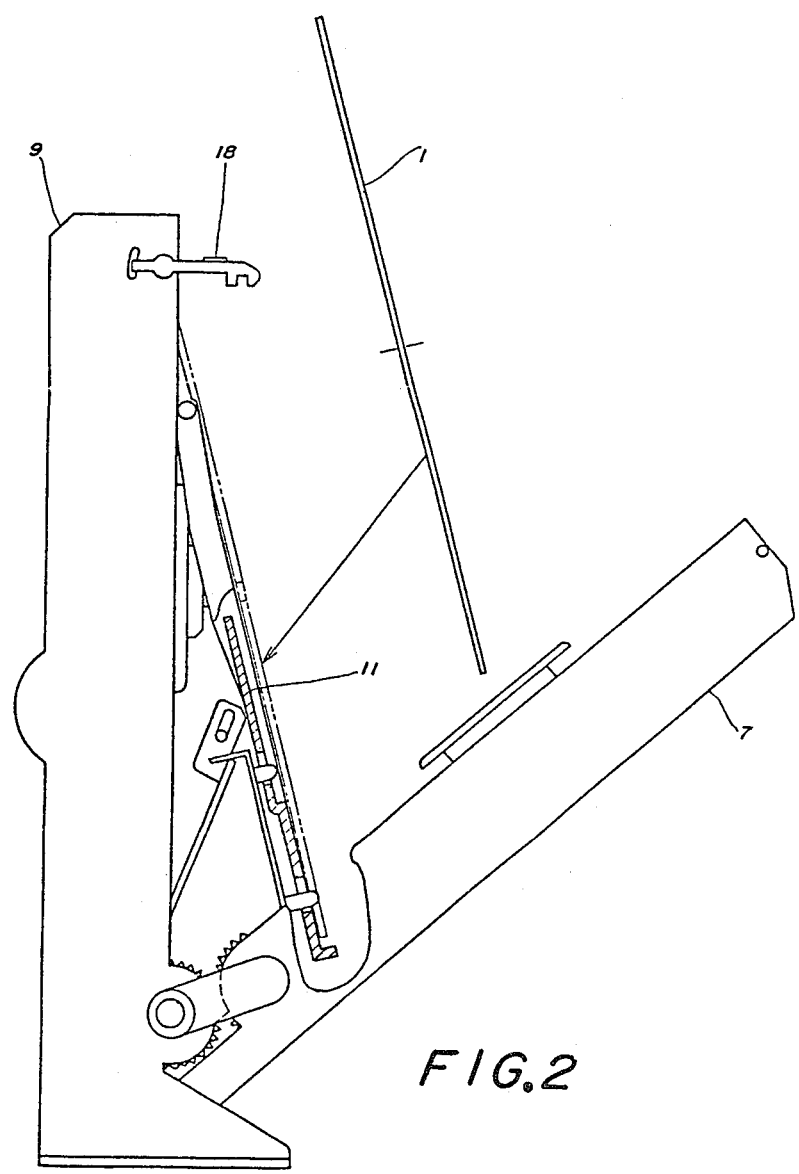
FIG. 2 is a cross sectional side view of a record player section with a lid in the open position.
Figure 3:
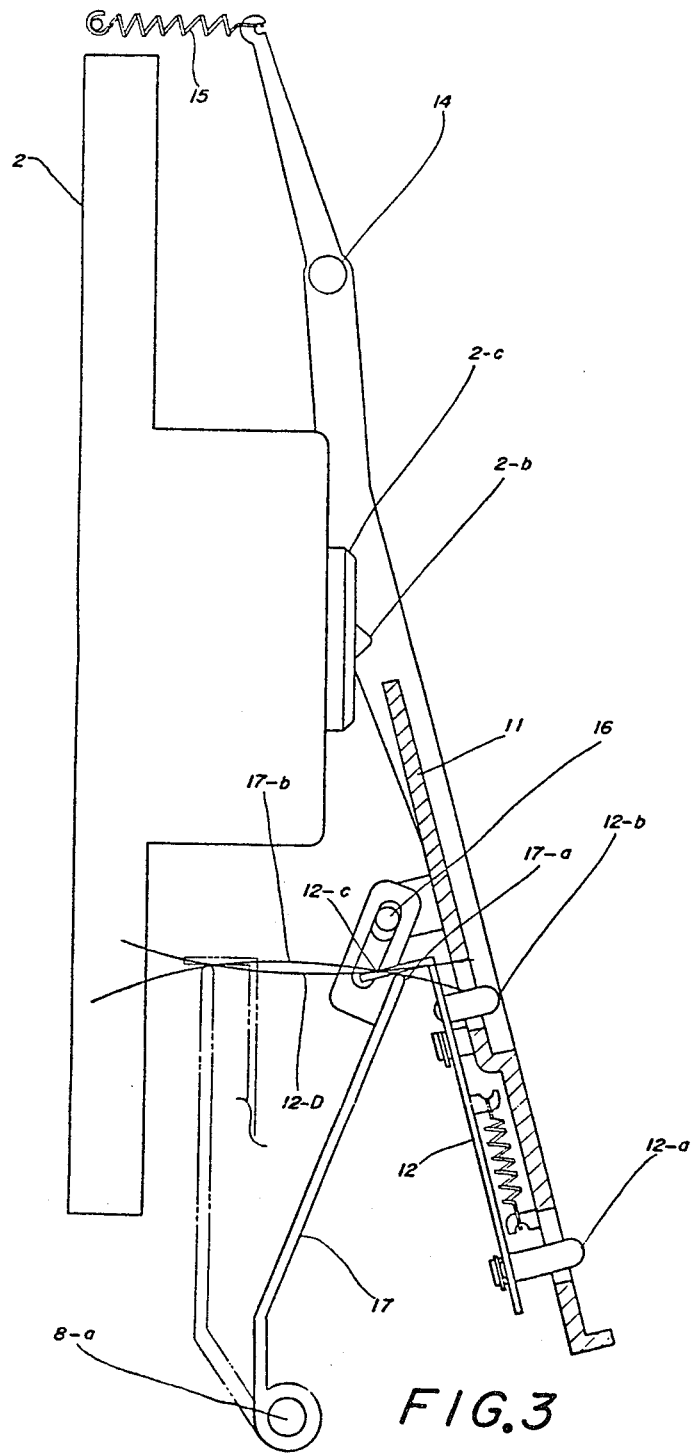
FIG. 3 is a cross sectional view of a record mount, a slide guide plate and an interlock plate.

FIG. 2 illustrates the record player emboding the present invention with the lid in the open position and the LP record 1 on the record mount 11. The periphery of the disc record is supported by means of two guide pins 12a and 12a' affixed through caulking to a slide plate 12 (see FIGS. 1A and 3) which in turn is slidable on the record mount 11. An EP disc record is instead supported by means of guide pins 12b and 12b'. These guide pins 12a, 12a', 12b and 12b' extend in the same axial direction with respect to each other and with respect to the center of the turntable. With such an arrangement, the disc record is in bilateral alignment with the center of the turntable. If the operator manually turns the lid 7 toward the body side 9, then the lid 7 is rotated about pivots 8 and 13 to be discussed below. As the lid 7 is moved to its closed position, the record mount 11 is forced into the body side about a pair of pivots 14 by integral parts 7a and 7b of the lid 7. The left side pivot is denoted by 14L and the right side one by 14R. At this moment springs 15L and 15R are pulled and, when the lid 7 is moved to the open position, serve to push the record mount 11 forwardly. The slide plate 12 slidable on the record mount 11, as shown in FIG. 3, is under the influence of the springs 15 so that a bent portion 12C of the slide guide plate 12 strikes an interlock plate 17 and is guided by the interlock plate 17. The interlock plate 17 is rotatable about a shaft 8a of the pivot 8 although another pivot is available for this purpose. The movement of the slide guide 12 is limited by the interlock plate 17 for the following reasons. The slide guide 12 moves in a vertical direction (a direction toward the center of the turntable) to the extent which corresponds to the deviation between the rotating trajectory 17b of the tip 17a of the interlock plate 17 and the rotating trajectory 12D of a bent portion 12C of the guide plate 12 and reaches its highest level immediately before the disc record is inserted into the tip 2b of the turntable or an EP adapter 2c in the case of an EP record. Under these circumstances, as the lid 7 is on the way moving to its closed position, the turntable shaft 2b plunges into an opening while pushing the EP adapter in the case of an LP record. As soon as the slide guide 12 has reached its highest level, it begins falling along the trajectory 17b and the pins 12a and 12a' resting on the slide guide 12 move away from the peripheral edge of the LP record. On the contrary, in the case of the EP record, the EP adapter 2c is inserted into the opening of the EP record and the pins 12b and 12b' move away from the peripheral edge of the EP record. If the lid 7 is closed, then the record is urged against the turntable 2 by means of the record pressing member 10 whether it is the LP record or the EP record. When the lid 7 is fully open and the player is in playing mode, the integral parts 7a and 7b of the lid moves the record mount 11 away from the record not to cause friction with the record during its rotation.

The above procedure completes loading of the disc record with a lock pin 7c on the lid 7 being locked with a lock plate 18 to prevent movement of the lid 7 in play mode.

The lid 7 will be opened in the following manner. The lock plate 18 is disengaged from the lock pin 7c to open the lid 7. At this time the record mount 11 in cooperation with a spring acting on the record pressing member 10 pushes the record being urged with the springs 15L and 15R. Upon further opening movement of the lid 7 the record 1 moves out of the turntable shaft 2b (the EP record moves out of the EP adapter). The pins 12a and 12a' resting on the slide guide plate occupy its highest level in a manner opposite with the closing movment of the lid, receiving the peripheral edge of the record. Since the pins 12a and 12a' (the pins 12b and 12b' in the case of the EP record) move toward from below the disc record (from the peripheral direction of the record) and receive the peripheral edge of the record, there is no possibility that the record may fall toward the operator when moving out of the turntable. If the lid 7 is further opened, then the record pressing member 10 also moves away from the turntable and the opening movement of the lid 7 is completed such that the operator gains direct access to the record for easy removal of the record.

Figure 4:
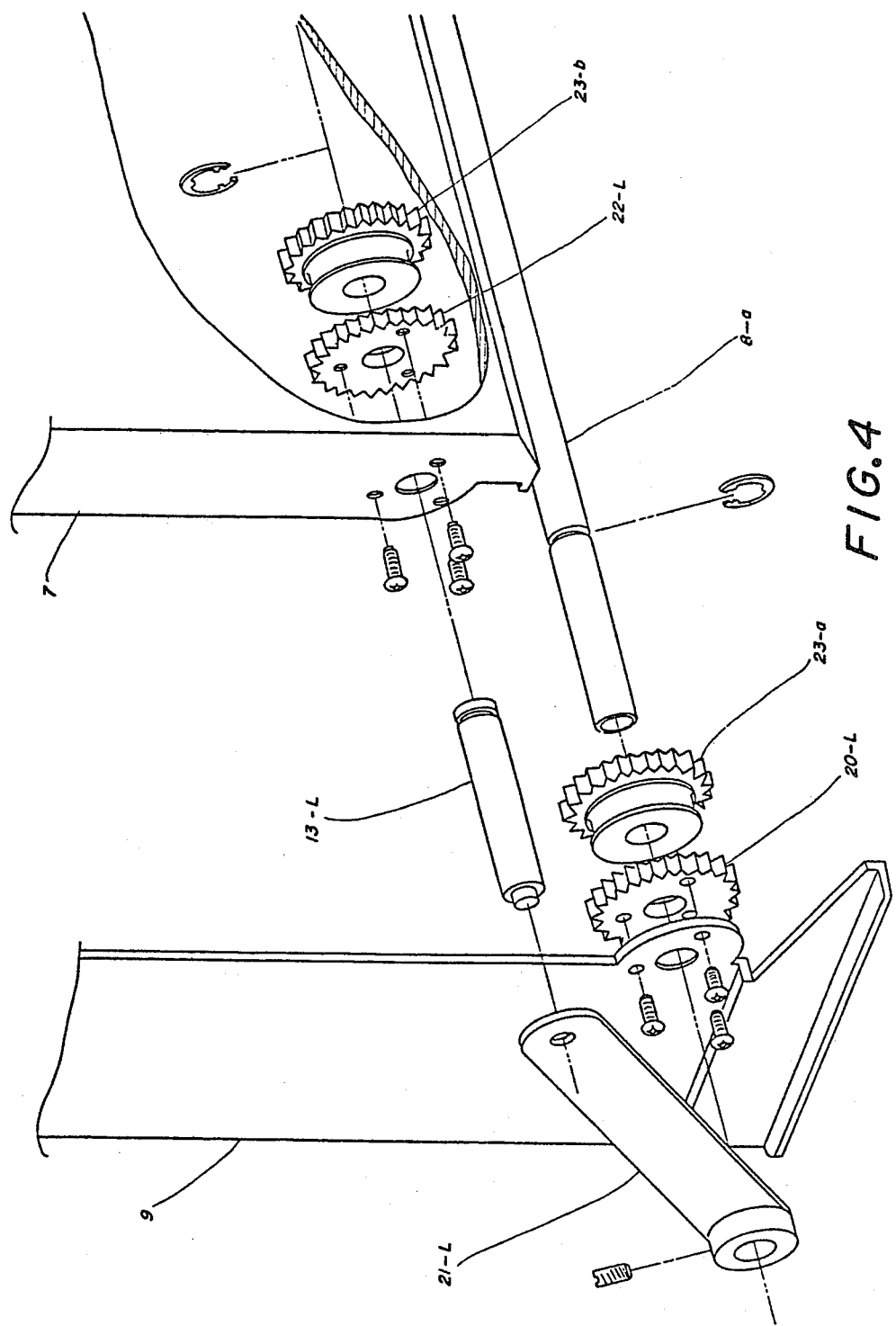
FIG. 4 is an exploded view of a lid-pivoting gear assembly.

Operation of the lid 7 will be discussed in further detail by reference to FIG. 4. Although the lid structure is not primarily for the purpose of making possible both side playing, a series of mechanical movements in association with the lid structure will be of assistance for a better understanding of the present invention.

Cartridge drive assemblies 5 and 6 are commonly enabled through merely a cartridge driving motor 19. The shaft 8a of the pivot 8 for the lid 7 is screwed into an inner surface of a player body 9 via gears 20L and 20R and a pair of lid-actuating arms 21L and 21R are screwed into an extension of the shaft 8a extending from the body. The shaft 8a is rotatable about the gears 20L and 20R serving as bearings. A shaft 13R serving as another pivot for the lid is caulked on the lid-actuating arm 21L and a shaft 13R is caulked on the arm 21R, both of which are coaxial with each other. A gear 22L rotatable on the shaft 13L is fixedly screwed into the left side inner surface of the lid 7, while the gear 22R is fixed on the right side inner surface of the lid 7 on the shaft 13R. These four gears 20L, 20R, 22L and 22R are of the same module and the same number of teeth. As the lid moves from its closed position to its open position, the gears 22L and 22R move about the shaft 8a in the direction of opening the lid with the respective pairs of the gears 20L and 22L and 20R and 22R in engagement relationship. There is provided on the shaft 8a a rotatable string drum 23a, whereas another string drum which is identical with the above mentioned drum as to configuration is secured on the shaft 13L, both of the drums being held in engagement relationsip. Under such engaging relationship, there is no disalignment between the gear 22L and the string drum 23b even when the lid 7 is opened or closed. A rope 26 such as a string or a wire is wound about the drum 23b, with its one end leading to a rotary pulley 24a, other pulleys 24b and 24c and a rope clamp 5c of the cartridge drive assembly 5 and its remaining end leading to pulleys 24D, 24E, 24F and 24G and the rope clamp 5c of the cartridge drive assembly without loose-fitting or slippery engagement. With the above arrangement, the cartridge drive assembly 5 is movable with rotation of the string drum 23b, as will be more clearly understood later.

Similarly, a rope 27 is wound about the drum 23a with its one end leading to a pulley 25a, another pulley 25b and a rope clamp 6c of the cartridge drive assembly 6 with its remaining end leading to pulleys 25C and 25D and the rope clamp 6c of the assembly 6. This makes its possible to move the assembly 6 with rotation of the string drum 23a.

Each of the ropes 26 and 27 is of a loop configuration and movable with rotation of the string drum 23a. It will be evident from the rope routes that when one of the cartridge drive assemblies 6 moves toward the center of the turntable, the other assembly moves in the same direction. Because of the string drums 23a and 23b being of the same shape or the same diameter, the assemblies 5 and 6 move to the same extent.

There is further provided a gear 28 mating with a geared portion of the string drum 23a and a worm wheel coaxial (preferably, integral) with the gear 28 mating with a worm 29 secured on a shaft of the motor 19 which may be rotatable in either the forward or backward direction.

Figure 5:
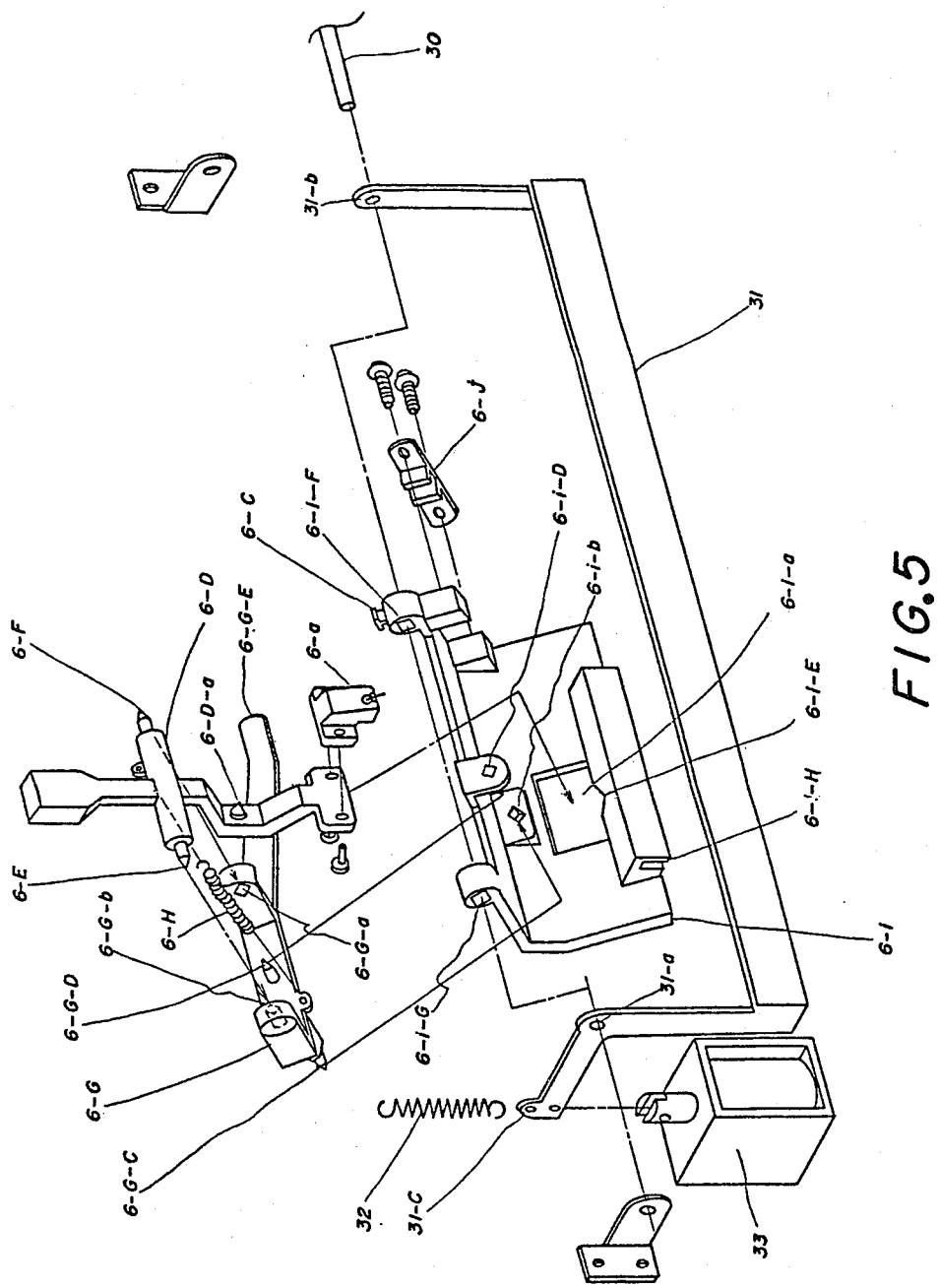
FIG. 5 is an exploded view of a cartridge drive device.

As stated previously, the gear 28 rotates and the string drum 23a is rotatable in either the forward or backward direction with rotation of the motor 19. At the same time the cartridge drive devices 6 and 5 move to or out of the center of the turntable, enabling the motor in any one of the forward and backward directions through operation of a switch, moving the cartridge drive devices to a desired position and shifting the cartridges 5a and 6a to a proper groove in the record where it is desired to start playing. At this time pickup styluses in the respective cartridges are kept away from the record in order that it may not strike or damage the record due to movement of the cartridge. When reproduction is desired on the A side of the disc record 1, the cartridge 5a is moved to a proper groove in the record with rotation of the motor 19 via the operation of the switch to thereby place the cartridge into contact with the A side of the disc record. In the case of the B side reproduction, the cartridge 6a is placed into contact with the B side of the record. An assembly for placing the cartridge styluses into engagement or disengagement with regard to the record will be detailed in the following paragraph as well as the cartridge drive assemblies. It is already noted that the drive assemblies 5 and 6 are of the same configuration and may be disposed symmetrically with each other. The cartridge drive assembly 6 will now be mainly discussed as well as its peripheral parts by reference to an exploded view of FIG. 5.

The cartridge 6a is secured on an arm 6D through the use of threads. The arm includes a pair of rotary shafts 6E and 6F as a unitary unit and has a conically-shaped tip. The cartridge is designed to demonstrate the smallest resistance to rotation of the cartridge toward the record when the cartridge impinges on the record. The arm holder 6E is provided with rectangular recessed bearings 6Ga and 6Gb. The rectangular recessed bearings are disposed to receive the arm shafts 6E and 6F like a "V" shaped groove with its opposite corners being oriented in a vertical direction. The arm 6G is made of a flexible material such as plastic so that it may be expanded for insertion of the arm shafts 6E and 6F. As an alternative, the bearings may be set up separately from the arm and combined through the use of threads or the arm shafts may be set up separately and incorporated with the aid of a spring. A tension spring 6H is disposed to extend between a spring clamp on the arm 6D and the equivalent of the arm holder 6G. The spring is somewhat inclined in a direction to receive thrust at the tip of the arm shaft 6E, that is, a direction to pull the spring outwardly of the center of the turntable and exert stylus pressure on the record. The biasing force of the spring serves to prevent undesirable oscillation of the cartridge drive assembly when the drive assembly moves gradually toward the center of the turntable in play mode.

The arm 6D is inserted into an aperture 6ia in the arm base 6i. Shafts 6GC and 6GD integral with the arm holder 6G are of the same shape as that of the arm shafts 6E and 6F one of which is received within a rectangular recessed bearing 6ib and the other of which is received within the bearing 6iD. As discussed with respect to the arm holder 6G, the arm base 6i is set up of flexible material. The rectangular recessed bearings are disposed such that its opposite corners are directed in a vertical direction to receive the weights of the arm, the cartridge and the arm holder like a "V" shaped groove and the bearing 6ib is somewhat inclined and lower than the other bearing. Such an inclination is selected as small as possible such that the tip of the shaft 6GC of the arm holder slides into the bottom of the bearing 6ib with a minimum of differential thrust. A centering pin 6Da integral with the arm 6D is of a conical shape and held in pressure contact with a "V" shaped pin groove 6iE in the arm base 6i by means of a spring 6H. This results in limiting the location of the arm. It is therefore noted that the arm 6D remains settled in the same position with regard to the arm base 6i except in play mode. A photo-coupler 6j is installed on the arm base 6i and a shutter 6GE is secured as a unitary component on the arm holder so that, when the arm 6D is turned slightly to the center of the turntable about the shafts 6GC and 6GD of the arm holder, the shutter 6GE is also rotated to shut off an optical path in the photo-coupler. It is also obvious that the optical path in the photo-coupler may be opened upon movement of the arm for the purpose of the present invention. The arm base 6i is provided with rectangular apertures 6iF and 6iG through which the shaft 30 passes. The rectangular apertures 6iF and 6iG are mounted on the shaft 30 in a reversed "V" form such that two opposite corners are oriented in a vertical direction.

The guide rail 31 is snugly received within a rail sliding portion 6iH on the arm base 6i for smooth sliding movement. The shaft 30 passes through holes 31a and 31b in the guide rail 31 for rotation. An armlike spring clamp 31c is formed from one side of the guide rail for receiving one end of a tension spring 32. The remaining end of the spring 32 is also received at a spring clamp on the body side 9. The tension force of the spring permits the guide rail 31 to rotate and the whole of the cartridge drive assemblies to rotate about the shaft 30 so that the stylus in the cartridge resting on the tip of the cartridge is spaced from the record. A plunger 33 is mounted on the body 9 (or the lid 7) against the tension force of the spring 32, which plunger rotates the guide rail 31 while offsetting the load of the spring 32. As a result, the cartridge stylus comes into contact with the record and the centering pin 6Da moves away from the "V" shaped pin-receiving portion 6Da of the arm base.

The cartridge drive assemblies operate in the following manner. The cartridge is moved to the desired groove in the disc record in the above stated manner for reproduction. If reproduction is desired on the B side under these circumstances, then the switch is turned on to supply current to the plunger 33. On the contrary, if reproduction is desired on the A side, a plunger 34 on the rear of the player is energized through operation of the switch. The A side or B side may be selected according to which of the plungers is energized.

Concurrently with energization of the plunger the motor 3 is rotated in any of the forward or backward direction so that the turntable is rotated clockwise for A side playing and couterclockwise for B side playing, for example. Of course, the rotation rate of the turntable is selectable between 33⅓ rpm and 45 rpm through operation of a switch.

Figure 6:
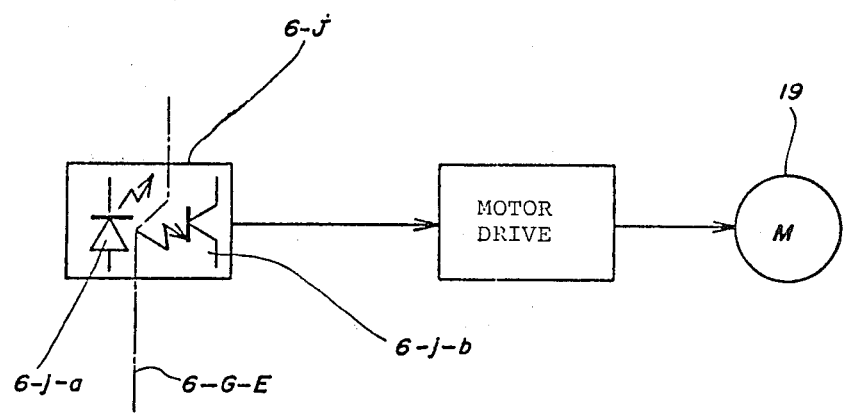
FIG. 6 is a schematic view of a photocoupler, a driver and a motor connected to each other.

The following description will go into details of B side playing only since A side playing is identical with B side playing. Upon energization of the plunger 33 the stylus in the cartridge 6a contacts the record and applies a stylus pressure proper for reproduction to the record via the spring 6H. At this moment the motor 3 rotates the turntable couterclockwise. By virtue of the grooves in the record the cartridge moves toward the center of the turntable and the arm 6D rotates and the photo-coupler 6j is shut off with the shutter 6GE on the arm holder. It is however desirable that the amount of rotation of the arm be as small as possible in order to avoid erroneous operation of the photo-coupler. Once the photo-coupler has been shut off, the motor 19 is enabled to move the drive assembly 6 so as to rotate the cartridge toward the center of the turntable to a fixed extent. The fixed extent means the number of revolutions necessary to move the cartridge drive assembly so as to bring the cartridge stylus into contact with the groove in the record and shut off the photo-coupler. Through repetition of the above procedure the arm never inclines at an angle exceeding a predetermined one so that the drive assembly is gradually conveyed toward the center of the turntable to complete reproduction on all of the grooves in the record. An example of combination of the photo-coupler, an electric circuit and the motor is illustrated in FIG. 6, wherein an element 6ja is implemented with a light emitting diode and an element 6jb is implemented with a photo-transistor, a light emitting diode or the like.

The following is a bird's-eye view of all of the events from the situation where the lid 7 is in open position through that where playing is in operation.

(1) When the LP record is to be played,

1. Under the condition where the lid 7 is in the open position (see FIG. 2), the record is mounted such that its peripheral edge rests on the guide pins 12a and 12a' extending along the record mount 11 which holds the record at a proper inclination.

2. If the lid 7 is manually closed, then the integral parts 7a and 7b of the lid press the record mount so that the record mount carrying the record thereon is positioned substantially in a vertical direction and moves upwardly immediately before the shaft 2b of the turntable impinges on the record. Consequently, the guide pins 12a and 12a' bring the central opening of the record in place to pass through the turntable shaft. Concurrently with or immediately before this condition is reached a lower portion of the record pressing member 10 starts pressing the record. Upon further closing movement of the lid the record is urged against the turntable with the aid of the record pressing member without slipping off. It is noted that at this moment the record pressing member has started being compressed with the spring which biases the record pressing member. Furthermore, as the lid is placed into the closed position the record mount moves away from the disc record. The record is free from rotation of the turntable. As soon as the record comes into engagement with the turntable the guide pins start falling away from the peripheral edge of the record. The lid is finally locked in fully closed position.

3. Through operation of the switch the motor 19 is enabled in one of the opposite directions to rotate the string drums 23a and 23b and move the cartridge drive assemblies 5 and 6 in place for reproduction.

4. Either of the two switches for A side or B side is actuated. When the B side is selected, the turntable begins rotating couterclockwise with the motor 3. The plunger 33 is energized to bring the cartridge stylus into contact with the record for reproduction.

5. By moving the cartridge toward the center of the turntable (or the record) by virtue of the grooves in the record, the shutter 6GE on the arm holder shuts off the photo-coupler 6j and current flows through the motor 19. The drive assembly moves toward the center of the turntable so as to compensate for the previous movement of the cartridge. Through repeated execution of this procedure reproduction proceeds to the last groove in the record.

6. Upon completion of reproduction the switch is switched to disenergize the plunger and to discontinue rotation of the turntable. As is obvious, it is not necessarily required to discontinue rotation of the turntable.

7. The motor 19 is enabled via the switch to return the cartridge drive assembly to its home position (this is generally outside the outer diamete of the LP record).

8. The lid 7 is unlocked. The lid moves in the opposite direction and the record mount impinges on the record with a space between the peripheral edge of the record and the guide pins 12a and 12a' (this space is of importance and othrwise, when the record is in contact with the guide pins, the record may move out of the turntable shaft and slip off upon release from the record pressing member. Upon further opening movement of the lid the record removes from the turntable shaft under the condition where the record is urged against the record mount with the aid of the record pressing member. The guide pins 12a and 12a' moves up to offset the space with regard to the peripheral edge of the record and holds the record from below. Provided that the lid is further opened, the record pressing member 10 is spaced to allow removal of the record.

(2) When the EP record (normally, a rotation rate of 45 rpm and a diameter of the central opening of 38.2 mm) is to be played, the mode of operation is similar to the foregoing except for the following aspects.

1. Whereas the guide pins 12a and 12a' are of use in loading the LP record, the guide pins 12b and 12b' are useful in loading the EP record.

2. Whereas the LP record is fitted into the turntable shaft 2b, the EP record is fitted into the adapter 2c.

It is clear from the foregoing description that selection as to the EP record or the LP record is possible as well as selection of the rotation rate of the disc record prior to loading the record. When the selected one of the records is set and the play button is actuated, playing automatically proceeds. Upon completion of playing the record also is automatically shifted to a delivery slot. These aspects are not new in the prior art. Moreover, although the cartridge drive assemblies for the A side and B side are driven at the same time, they may be driven separately through independent sources of driving force.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A record player for selectively playing either side of a disc record comprising:
   a player body;
   a turntable including a turntable shaft being operatively mounted in a vertical direction within said player body;
   a first vertical linear tracking type record reproduction assembly operatively mounted in said player body;

a record mount for initially receiving a disc record being pivotally mounted to said player body for rotating said disc record into engagement with said turntable shaft;

a lid pivotally mounted to said player body;

a second vertical linear tracking type record reproduction assembly operatively mounted in said lid;

common drive means for selectively imparting linear motion to said first and second vertical linear tracking type record reproduction assemblies from a preselected point on said record disc to a central point on said record disc; and plunger means for selectively imparting motion to either said first vertical linear tracking type record reproduction assembly or said second vertical linear tracking type record reproduction assembly from a non-engaging position to a position in engagement with said disc record;

wherein rotation of said lid to a closed position relative to said player body rotates said record mount to engage said disc record with said turntable shaft and disengage said record mount from said disc record thereafter said plunger means and said common drive means may be actuated to selectively play a recording from either side of said disc record.

2. A record player according to claim 1, wherein said first linear tracking type record reproduction assembly includes a rail sliding portion slidable mounted on a guide rail, an arm holder is pivotally mounted relative to said rail sliding portion, a cartridge is operatively connected to said arm holder and selectively displaced for engagement with a first surface of said disc record.

3. A record player according to claim 1, wherein said second linear tracking type record reproduction assembly includes a rail sliding portion slidable mounted on a guide rail, an arm holder is pivotally mounted relative to said rail sliding portion, a cartridge is operatively connected to said arm holder and selectively displaced for engagment with a second surface of said disc record.

4. A record player according to claim 1, wherein as said lid is closed relative to said player base said record mount is rotated in a clockwise direction as said lid is rotated in a counterclockwise direction.

5. A record player according to claim 1, and further including a record pressing member operatively connected to said lid for pressing said disc record against said turntable when said lid is in the closed position.

6. A record player according to claim 1, and further including a slide guide and guide pins operatively positioned relative to said record mount for initially positioning a record disc relative thereto when said lid is in an open position and subsequently being disengaged from said record disc when said lid is closed relative to said player base.

7. A record player according to claim 1, wherein said common drive means includes a reversible motor operatively connected by a series of pulley and ropes to said first and second vertical linear tracking type record reproduction assemblies for selectively imparting simultaneous linear motion thereto.

8. A record player according to claim 1, wherein said plunger means includes a first plunger operatively connected to said first vertical linear tracking type record reproduction assembly and a second plunger operatively connected to said second vertical linear tracking type record reproduction assembly, said first and second plungers being individually, selectively actuated for engaging and disengaging said first and second vertical linear tracking type record reproduction assemblies relative to said disc record.

9. A record player according to claim 2, and further including a photo-coupler operatively positioned relative to said rail sliding portion, said photo-coupler generating a signal to actuate said common drive means to rotate in a first direction after said plunger means is actuated to engage said first vertical linear tracking type record reproduction assembly with a first side of said disc record.

10. A record player according to claim 3, and further including a photo-coupler operatively positioned relative to said rail sliding portion, said photo-coupler generating a signal to actuate said common drive means to rotate in a first direction after said plunger means is actuated to engage said second vertical linear tracking type record reproduction assembly with a second side of said disc record.

* * * * *